United States Patent Office 3,483,156
Patented Dec. 9, 1969

3,483,156
METHOD OF PREPARING TAPE JOINT CEMENT
Edward J. Mills, Jr., and John F. Suter, Charleston, W. Va., assignors to Union Carbide Corporation, a corporation of New York
No Drawing. Filed Dec. 12, 1966, Ser. No. 600,741
Int. Cl. C08f 29/42; C09j 3/14
U.S. Cl. 260—29.6                                6 Claims

ABSTRACT OF THE DISCLOSURE

A sensibly dry free-flowing powder adapted to be mixed with water to form a tape joint cement is formulated by first preparing an intimate admixture of powdered mica and an aqueous dispersion of poly(vinyl acetate) and then blending this admixture with one or more inert fillers selected from the group consisting of calcium carbonate, clay, silica and asbestos, while adjusting the water content to provide 8% to about 20% by weight water as hereinafter described.

---

This invention relates in general to tape joint cements and in particular to a novel method for the preparation of a sensibly dry free-flowing composition adapted to be mixed with water to form a tape joint cement.

Tape joint cements are utilized in the application of wall board, their function being to fill the spaces between adjoining boards to provide a smooth seamless surface. Typically, the space is filled with the tape joint cement and lapped for an inch or two to either side on the wallboard, a perforated paper tape is pressed into the cement until embedded, and one or more additional coats of cement are then applied.

Tape joint cements are currently marketed in two forms, namely, a "ready mix" which is a finished formulation needing only stirring before application and a "dry mixture" which is in the form of a sensibly dry free-flowing powder to which water is added and stirred until a workable consistency is attained. In either form, the essential components are a major proportion of an inert filler, such as, for example, calcium carbonate, clay, mica, silica, asbestos, and the like, and a minor proportion of a binder which serves to hold the cement together and prevent crumbling, to adhesively bond to the wallboard, and to secure the tape.

Various materials have been proposed heretofore for use as a binder in the "dry mixture" taype of formulation. In certain instances, the "dry mixture" has been prepared by blending of two ingredients each of which is itself in a dry state. For example, the dry inert filler, or mixture of fillers, is blended with powdered casein or with a spray-dried poly(vinyl acetate) resin, such as is described in United States Patent 2,800,463. An alternate technique, also known to the art, is to prepare the "dry mixture" by blending the dry inert filler with an aqueous solution or dispersion of polyvinyl alcohol, the amount of the aqueous solution or dispersion employed being limited to that at which the blend will be sensibly dry, i.e., dry to the touch and capable of being packed as a dry product. This method is disclosed in United States Patent 3,084,133. Each of these prior art procedures, however, suffers from certain disadvantages. Thus, for example, the blend of inert filler and powdered casein can be mixed with water to give a uniform composition only with great difficulty and, furthermore, the casein is subject to putrefaction on ageing. These problems are avoided by the use of spray-dried poly(vinyl acetate) resin, but this material, because of the complex procedure involved in recovering the resin in dry form, is ordinarily too expensive for use in tape joint cements. Moreover, elaborate precautions must be taken to ensure that the blend of filler and spray-dried poly(vinyl acetate) remains dry until ready for use for the reason that if agglomeration occurs because of blocking of the resin then when water is added in preparation for use the resulting tape joint cement will contain undispersed particles. The sensibly dry blend of inert filler and aqueous solution or dispersion of polyvinyl alcohol mixes readily with water to form a workable consistency, but the polyvinyl alcohol is sensitive to any trace of borax in the mixing equipment or on the surface being covered and the ensuing reaction causes gelation and precipitation in the cement.

It has now been discovered that a sensibly dry free-flowing composition which may be stored and is easily mixed with water to form a tape joint cement and which successfully avoids the disadvantages of the prior art can be prepared by the novel method which is hereinafter described. This method utilizes as binder an aqueous dispersion of poly(vinyl acetate), a product which is of very low cost relative to a spray-dried poly(vinyl acetate) resin, and, contrary to what was heretofore believed, as evidenced by the teachings of United States Patent 3,084,133, achieves adequate binding power at commercially feasible concentrations of resin in the tape joint cement.

In accordance with the present invention, a sensibly dry free-flowing powder adapted to be mixed with water to form a tape joint cement is formulated by first preparing an intimate admixture of powdered mica and an aqueous dispersion of poly(vinyl acetate) and then blending this admixture with one or more inert fillers selected from the group consisting of calcium carbonate, clay, silica and asbestos, while adjusting the water content as hereinafter described. Other conventional components of tape joint cements such as perservatives, surface active agents, plasticizers, filming aids, thickening agents, tackifiers, and so forth, may also be added depending on the requirements of the particular application.

It was unexpected and surprising to find that an aqueous dispersion of poly(vinyl acetate) could be utilized as the binder in a tape joint cement of the "dry mixture" type and that this could be accomplished by the simple expedient of first mixing the aqueous dispersion of poly-(vinyl acetate) with powdered mica and then blending the poly(vinyl acetate)/mica mixture with other conventional ingredients of a tape joint cement and properly regulating the water content of the resulting "dry mixture." In particular, it was found that it is essential to the success of this procedure to employ mica, rather than other conventional inert fillers, to form the initial mixture, as only by this technique can a product which is smooth and free of agglomerates be obtained. This is apparently due to differences between mica and other conventional inert fillers in wetting characteristics and affinity for poly-(vinyl acetate) resin particles, although applicants do not, of course, intend to be bound by any such explanation. It is also essential to the success of the method of this invention to establish a water content within specified limits, as hereinafter disclosed, in the final "dry mixture" in order to have a sensibly dry free-flowing powder to which the user can add water to produce a tape joint cement without risk of the formation of agglomerates which would render the cement unusable.

The aqueous dispersions of poly(vinyl acetate) of utility for the purposes of this invention are those containing from about 40 to about 65 percent by weight resin solids, more preferably from about 50 to about 60 percent by weight. The particle size of the resin is not critical as it is essential only that the dispersion by stable, i.e. not subject to precipitation or coagulation under the conditions of use. Generally, the particle size will be in the range from about 0.1 to about 8 microns and more preferably in the range from about 0.5 to about 3 microns. The resin may be a homopolymer of vinyl acetate or a copolymer of vinyl acetate with an ethylenically unsaturated polymerizable comonomer such as dibutyl maleate, dibutyl fumarate, vinyl propionate, ethyl acrylate, butyl acrylate, isobutyl acrylate, 2-ethylhexyl acrylate, and the like, and it is intended to include both homopolymer and copolymers within the scope of the term "poly(vinyl acetate)" as employed herein.

The mixing of the aqueous dispersion of poly(vinyl acetate) and the powdered mica may be carried out in any convenient manner known to the art, as the particular procedure employed is not critical as long as intimate mixing of the two materials is achieved and caking is avoided. Thus, for example, the aqueous dispersion of poly(vinyl acetate) may be added dropwise to an agitated mass of powdered mica at such a rate that no agglomerates are formed. A twin-shell blender or sigma blade internal mixer are well suited to this purpose.

The poly(vinyl acetate)/mica mixture is prepared in accordance with this invention by mixing the aqueous dispersion of poly(vinyl acetate) with the powdered mica in a proportion providing a content of water of from about 5 percent to about 25 percent by weight, based on the total weight of the mixture, more preferably from about 10 to about 20 percent by weight. Thus, where the aqueous dispersion of poly(vinyl acetate) employed contains only about 40 percent total solids it should be mixed with the powdered mica in a ratio of about 0.1 to about 0.7 part of aqueous dispersion per part of powdered mica by weight, whereas when the aqueous dispersion of poly(vinyl acetate) contains about 65 percent total solids it should be mixed with the powdered mica in a ratio of about 0.2 to about 2.5 parts of aqueous dispersion per part of mica by weight.

To prepare the sensibly dry free-flowing composition which may be mixed with water by the user to form a tape joint cement, the poly(vinyl acetate)/mica mixture described hereinabove is blended with at least one inert filler selected from the group consisting of calcium carbonate, clay, silica, and asbestos. In addition to such inert filler, one or more of the other conventional components of tape joint cements hereinbefore mentioned may also be incorporated in the formulation in minor amounts. In any event, the amount of calcium carbonate, clay, silica or asbestos utilized should be such that the product, i.e. the sensibly dry free-flowing composition which is to be mixed with water to form a tape joint cement, contains from about 2 to about 10 percent, preferably from about 4 to about 8 percent, of poly(vinyl acetate), calculated as dry solid, based on the total weight of the composition. This amount of poly(vinyl acetate) is necessary to ensure adequate binding power. Amounts greater than 10 percent could also be employed but with little additional advantage accruing thereto and, of course, the disadvantage of added cost. It is also necessary that the amount of water in the sensibly dry free-flowing composition be within a range of about 8 to about 20 percent, more preferably about 10 to about 16 percent, to ensure that a smooth product which is free of agglomerates will be produced when the user adds water to obtain a cement of working consistency. The amount of water ultimately added to prepare the tape joint cement will, of course, depend upon the desired working consistency and will thus vary with the particular application involved.

The invention is further illustrated by the following specific examples of its practice.

EXAMPLE 1

Sixty grams of powdered mica was weighed into a beaker and then a 40-gram quantity of a poly(vinyl acetate) resin latex with a total solids content of 50% and a particle size in the range of about 0.6 to about 1.2 microns was added slowly while constantly stirring with a spatula. The resulting mixture, consisting of 60% by weight mica, 20% by weight poly(vinyl acetate) and 20% by weight water, was a sensibly dry free-flowing powder. The mixture was placed in a capped jar and rotated on a can roll for 64 hours with resulting noticeable improvement in uniformity.

A 200-gram sample of tape joint cement was then prepared from the poly(vinyl acetate)/mica mixture described above in accordance with the following recipe.

| Ingredient: | Wt. (grams) |
| --- | --- |
| Poly(vinyl acetate)/mica mixture | 39.14 |
| Calcium carbonate | 70.64 |
| Asbestos | 17.67 |
| Clay | 8.83 |
| Mica | 0.08 |
| Dibutyl phthalate | 0.76 |
| Ethylene glycol | 3.29 |
| Sodium o-phenylphenate | 0.29 |
| Water | 59.30 |
| | 200.00 |

The tape joint cement was screeded by trowel onto a wedge-shaped section of gypsum wallboard, 12 inches long and 4 inches wide and tapering from ¼ inch to a feather edge. The cement screeded very well, with no problems in application. After drying 64 hours at ambient temperature, the test section was observed to be strong and adherent, with a smooth surface. This example illustrates that a mixture of mica and an aqueous dispersion of poly(vinyl acetate) can be formulated and subsequently blended with other conventional ingredients to prepare a useful tape joint cement.

In contrast with the above results with mica, an attempt to prepare a sensibly dry free-flowing powder by mixing calcium carbonate and the poly(vinyl acetate) resin latex was unsuccessful. Specifically, when the identical poly(vinyl acetate) resin latex was slowly added to a 30-gram quantity of calcium carbonate, a wet and pasty mass resulted after addition of only 12 grams of latex. Thus, a sensibly dry free-flowing powder could not be obtained unless the quantity of poly(vinyl acetate) utilized were kept so low that there would not be sufficient binder in the final tape joint cement.

In further contrast with the above results with mica, it was found that a sensibly dry free-flowing powder could be obtained by mixing asbestos with the poly(vinyl acetate) resin latex, but that this mixture was not useful for preparation of a tape joint cement. Specifically, 60 grams of asbestos were mixed with 40 grams of the poly(vinyl acetate) resin latex in the same manner employed with the mica and then the mixture was rotated on a can roll for 64 hours without observable improvement in uniformity. A 200-gram sample of tape joint cement was then prepared from the poly(vinyl acetate)/asbestos mixture in accordance with the following recipe.

| Ingredient: | Wt. (grams) |
| --- | --- |
| Poly(vinyl acetate)/asbestos mixture | 29.45 |
| Calcium carbonate | 70.64 |
| Clay | 8.83 |
| Mica | 23.56 |
| Dibutyl phthalate | 0.76 |
| Ethylene glycol | 3.30 |
| Sodium o-phenylphenate | 0.29 |
| Water | 63.17 |
| | 200.00 |

The tape joint cement was not a usable composition as it contained numerous undispersed lumps of agglomerated asbestos and poly(vinyl acetate).

EXAMPLE 2

To a horizontally-rotating, sigma blade, internal mixer there was charged 1000 grams of powdered mica and then 600 grams of the poly(vinyl acetate) resin latex described in Example 1 was added dropwise to the rotating mass over a 2-hour period. The resulting mixture, which contained 61.2% mica, 19.8% poly(vinyl acetate) and 19.0% water, was sensibly dry and free-flowing. The poly(vinyl acetate)/mica mixture was then charged to a vertically rotating, sigma blade, internal mixer along with other conventional components of tape joint cement and mixed for 30 minutes. The recipe employed was as follows.

| Ingredient: | Wt. (grams) |
|---|---|
| Poly(vinyl acetate)/mica mixture | 144.36 |
| Calcium carbonate | 264.90 |
| Asbestos | 66.25 |
| Clay | 33.10 |
| Poly(vinyl acetate) resin latex (57.5% solids) | 1.34 |
| Dibutyl phthalate | 2.85 |
| Ethylene glycol | 12.35 |
| Methyl cellulose | 1.75 |
| Sodium o-phenylphenate | 1.10 |
| Water | 305.33 |
| | 833.33 |

The tape joint cement was observed to be smooth and uniform, with no undispersed particles. When it was screeded onto wallboard it handled well and yielded a smooth surface. After 64 hours of air drying, it was hard and adhered well to the surface of the board.

In contrast with the above results with mica, attempts to prepare a sensibly dry free-flowing powder by mixing 600 grams of the poly(vinyl acetate) resin latex in the identical manner described above with 1000 grams of asbestos, clay, calcium carbonate, and silica flour, respectively, were unsuccessful. Specifically, the mixture of asbestos and latex contained many small hard lumps which would not break apart; the mixture of clay and latex contained many large rubbery lumps which would not break apart; the mixture of calcium carbonate and latex had become a thick paste; and the mixture of silica flour and latex had become a thick, doughy mass. None of these mixtures was usable for the purpose of preparing a tape joint cement.

EXAMPLE 3

To a vertically-rotating, sigma blade internal mixer there was charged 1050 grams of powdered mica and then 748 grams of the poly(vinyl acetate) resin latex described in Example 1 was added dropwise to the rotating mass over a 90-minute period. The resulting mixture, which contained 60.4% mica, 20.0% poly(vinyl acetate) and 19.6% water, was sensibly dry and free-flowing. The poly(vinyl acetate)/mica mixture was then blended with other conventional components of tape joint cement in accordance with the following recipe.

| Ingredient: | Wt. (grams) |
|---|---|
| Poly(vinyl acetate)/mica mixture | 146.75 |
| Calcium carbonate | 246.90 |
| Asbestos | 66.25 |
| Clay | 33.10 |
| Dibutyl phthalate | 2.85 |
| Ethylene glycol | 6.18 |
| Methyl cellulose | 1.75 |
| Sodium o-phenylphenate | 1.10 |
| Water | 39.24 |
| | 562.12 |

The product was a sensibly dry free-flowing powder.

After storing the above-described powder for one week in a cardboard container at ambient temperature, 274.32 grams of water was added and the composition was mixed for 30 minutes to yield a tape joint cement of suitable working consistency. The cement was smooth and free of agglomerates and was easily applied to wallboard. After drying for 64 hours at ambient temperature, the surface was very smooth, hard and adherent and paper tape embedded in the joints could be stripped out only with difficulty, thereby evidencing good adhesion.

In contrast with the above results, attempts to formulate a tape joint cement without preparing an initial mixture of poly(vinyl acetate) and mica proved unsuccessful. Specifically, there were charged to a horizontally rotating, sigma blade, internal mixer the following ingredients.

| Ingredient: | Wt. (grams) |
|---|---|
| Calcium carbonate | 529.80 |
| Mica | 176.70 |
| Asbestos | 132.50 |
| Clay | 66.20 |
| Dibutyl phthalate | 5.70 |
| Ethylene glycol | 24.70 |
| Methyl cellulose | 3.50 |
| Sodium o-phenylphenate | 2.20 |
| | 941.30 |

While the mixture was rotated, 117.4 grams of the poly(vinyl acetate) resin latex described in Example 1 was added dropwise over a 2-hour period. The resulting mixture, which contained 6.10% poly(vinyl acetate) and 5.40% water, was sensibly dry and free-flowing. Upon blending 527 grams of this mixture with 307 grams of water in a vertically-rotating, sigma blade, internal mixer there was obtained a product containing numerous agglomerates of resin and filler which was not usable as a tape joint cement. In a second test, an identical formulation weighing 941.30 grams was prepared in the same mixer and 180 grams of the poly(vinyl acetate) resin latex described in Example 1, diluted with distilled water to a total solids content of 32.65%, was added dropwise over a 2-hour period. The resulting mixture contained 5.7% poly(vinyl acetate) and 10.8% water and was sensibly dry and free-flowing. Upon blending 527 grams of this mixture with 256.5 grams of water in a vertically-rotating, sigma blade, internal mixer there was obtained a product containing numerous agglomerates of resin and filler which was not usable as a tape joint cement.

In further contrast with the above results, it was found that even where an initial mixture of poly(vinyl acetate), and mica is prepared it cannot be used to formulate a "dry mixture," capable of being stored and requiring only the addition of water to yield a tape joint cement of working consistency, unless the water content of the "dry mixture" is properly adjusted. Specifically, the poly(vinyl acetate)/mica mixture containing 60.4% mica, 20.0% poly(vinyl acetate) and 19.6% water, described hereinabove, was employed in the following recipe.

| Ingredient: | Wt. (grams) |
|---|---|
| Poly(vinyl acetate)/mica mixture | 146.75 |
| Calcium carbonate | 264.90 |
| Asbestos | 66.25 |
| Clay | 33.10 |
| Dibutyl phthalate | 2.85 |
| Ethylene glycol | 6.18 |
| Methyl cellulose | 1.75 |
| Sodium o-phenylphenate | 1.10 |
| | 522.88 |

The product was a sensibly dry, free-flowing powder containing 5.5% by weight of water. This powder was stored for one week and then mixed with 313.76 grams of water in a vertically rotating, sigma blade, internal mixer for a period of 90 minutes. The resulting composition contained many small hard lumps of agglomerated resin and mica and was not usable as a tape joint cement, the formation of such agglomerates being attributable to the fact that the water content of 5.5% was below the minimum level of about 8% hereinbefore disclosed as being necessary.

As evidenced by the above examples, the method of this invention is critically dependent upon two factors for success. The first such factor is that the aqueous dispersion of poly(vinyl acetate) be initially admixed with mica to give a sensibly dry free-flowing powder, such result being attained by mixing the aqueous dispersion of poly(vinyl acetate) and the mica in such proportion as to give a mixture with a water content of about 5 to about 25 percent by weight. The second factor is that in blending the poly(vinyl acetate)/mica mixture with the inert fillers and other ingredients to yield a sensibly dry free-flowing powder which can be stored and requires only the addition of water to form a tape joint cement of working consistency, the water content be adjusted to a level of about 8 to about 20 percent by weight. In some instances, sufficient water to give the required water content of about 8 to about 20 percent by weight will be provided by the water in the aqueous dispersion of poly(vinyl acetate), while in other instances, depending upon the solids content of the aqueous dispersion of poly(vinyl acetate) and the amount of such dispersion employed, it will be necessary to add extra water. Addition of this extra water is suitably effected by dampening the inert fillers with the appropriate amount of water in advance of blending them with the poly(vinyl acetate)/mica mixture or by adding water concurrently with the blending of the inert fillers and the poly(vinyl acetate)/mica mixture.

As will be apparent from the foregoing description and examples, the method of this invention may be utilized commercially in various ways. Thus, for example, the poly(vinyl acetate)/mica mixture may be marketed to producers of tape joint cements who would in turn blend this mixture with other ingredients to prepare a desired formulation and sell such formulation to the ultimate user. Alternately, a "dry-mixture" requiring only the addition of water to form a usable tape joint cement could be prepared and stored in moisture-proof containers and marketed directly to the ultimate user. Finally, the person using the tape joint cement could follow the teachings of this invention to himself prepare cement utilizing an aqueous dispersion of poly(vinyl acetate) as binder.

What is claimed is:

1. A method of preparing a sensibly dry free-flowing composition adapted to be mixed with water to form a tape joint cement which method comprises intimately admixing a stable aqueous dispersion of poly(vinyl acetate), containing about 40 to about 65 percent by weight solids, with powdered mica in a proprotion providing about 5 to about 25 percent by weight of water based on the total weight of the mixture and thereafter blending said mixture of poly(vinyl acetate) and powdered mica with (1) at least one inert filler selected from the group consisting of calcium carbonate, clay, silica, and asbestos, and (2) sufficient water to provide about 8 to about 20 percent by weight of water, including the water originally in said aqueous dispersion of poly(vinyl acetate), based on the total weight of the composition; the proportion of said inert filler employed being such as to give a composition containing about 2 to about 10 percent of poly(vinyl acetate), calculated as dry solid, based on the total weight of the composition.

2. The method of claim 1 wherein said aqueous dispersion contains from about 50 to about 60 percent by weight solids.

3. The method of claim 2 wherein said aqueous dispersion is composed substantially of particles in the size range of from about 0.5 to about 3 microns.

4. The method of claim 3 wherein said aqueous dispersion of poly(vinyl acetate) and said powdered mica are admixed in a proportion providing about 10 to about 20 percent by weight of water based on the total weight of the mixture.

5. The method of claim 4 wherein sufficient water is added to provide about 10 to about 16 percent by weight water based on the total weight of the composition.

6. The method of claim 5 wherein said mixture of poly(vinyl acetate) and powdered mica is blended with said inert filler in a proportion providing about 4 to about 8 percent of poly(vinyl acetate), calculated as dry solid, based on the total weight of the composition.

References Cited

UNITED STATES PATENTS

| | | |
|---|---|---|
| 2,800,463 | 7/1957 | Morrison. |
| 3,084,133 | 4/1963 | Sirota et al. |
| 3,126,355 | 3/1964 | Birten et al. |

FOREIGN PATENTS

| | | |
|---|---|---|
| 1,037,947 | 8/1966 | Great Britain. |

MURRAY TILLMAN, Primary Examiner

H. ROBERTS, Assistant Examiner

U.S. Cl. X.R.

260—41, 89.1, 85.7, 78.5, 86.1; 106—308